United States Patent
Rohrmoser

(10) Patent No.: US 10,457,323 B2
(45) Date of Patent: Oct. 29, 2019

(54) HANDS-ON/-OFF DETECTION IN A STEER-BY-WIRE SYSTEM

(71) Applicants: THYSSENKRUPP PRESTA AG, Eschen (LI); thyssenkrupp AG, Essen (DE)

(72) Inventor: Manuel Rohrmoser, Thüringen (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/095,744

(22) PCT Filed: Apr. 20, 2017

(86) PCT No.: PCT/EP2017/059382
§ 371 (c)(1),
(2) Date: Oct. 23, 2018

(87) PCT Pub. No.: WO2017/186564
PCT Pub. Date: Nov. 2, 2017

(65) Prior Publication Data
US 2019/0217886 A1    Jul. 18, 2019

(30) Foreign Application Priority Data

Apr. 26, 2016    (DE) .......................... 10 2016 005 013

(51) Int. Cl.
*B62D 6/10*    (2006.01)
*B62D 5/00*    (2006.01)
(Continued)

(52) U.S. Cl.
CPC .............. *B62D 6/10* (2013.01); *B60W 40/09* (2013.01); *B60W 50/00* (2013.01); *B62D 5/001* (2013.01);
(Continued)

(58) Field of Classification Search
CPC . B60W 2050/0029; B60W 2050/0054; B60W 40/09; B60W 50/00; B62D 15/025;
(Continued)

(56) References Cited

U.S. PATENT DOCUMENTS 9,604,649 B1 *  3/2017  Pastor .................... B60W 40/09
9,840,275 B2 * 12/2017  Trimboli .................. B62D 6/10
(Continued)

FOREIGN PATENT DOCUMENTS

DE    10 2004 001 320 A    8/2004
DE    10 2007 039 332 A    2/2008
(Continued)

OTHER PUBLICATIONS

English Translation of International Search Report issued in PCT/EP2017/059382, dated Jul. 28, 2017 (dated Aug. 7, 2017).

*Primary Examiner* — Tyler J Lee
(74) *Attorney, Agent, or Firm* — thyssenkrupp North America, Inc.

(57) ABSTRACT

A steer-by-wire steering system may include a steering adjuster that is electronically controlled depending on driver input, a feedback actuator transmitting feedback from a road, and a control unit that actuates the feedback actuator and the steering adjuster. The control unit comprises an estimator including a monitor and a model of the feedback actuator. The estimator may estimate a driver's steering torque based on measurement values of the feedback actuator and with the model and the monitor, then providing the driver's steering torque as a result. The control unit further comprises a filter unit that analyzes the measurement values of the feedback actuator by determining the damping of amplitudes of predetermined frequency ranges and to provide the result. The control unit further comprises a decision unit that decides whether a driver's hand is in contact with (Continued)

a steering wheel by using the results of the filter unit and the estimator.

13 Claims, 3 Drawing Sheets

(51) Int. Cl.
*B60W 40/09* (2012.01)
*B60W 50/00* (2006.01)
*B62D 15/02* (2006.01)
*B62D 5/04* (2006.01)
*B62D 6/00* (2006.01)

(52) U.S. Cl.
CPC ........... *B62D 5/006* (2013.01); *B62D 5/0481* (2013.01); *B62D 6/008* (2013.01); *B62D 15/025* (2013.01); *B60W 2050/0029* (2013.01); *B60W 2050/0054* (2013.01)

(58) Field of Classification Search
CPC ...... B62D 5/001; B62D 5/006; B62D 5/0481; B62D 6/008; B62D 6/10
See application file for complete search history.

(56) References Cited

U.S. PATENT DOCUMENTS

| 2004/0148078 | A1* | 7/2004 | Nakano | B60C 23/00 701/41 |
| 2006/0069481 | A1* | 3/2006 | Kubota | B62D 5/0463 701/41 |
| 2008/0262676 | A1* | 10/2008 | Kawakami | B60W 40/09 701/41 |
| 2010/0228417 | A1* | 9/2010 | Lee | B62D 15/025 701/23 |
| 2014/0180544 | A1* | 6/2014 | Itamoto | B62D 5/049 701/41 |
| 2014/0371989 | A1 | 12/2014 | Trimboli | |
| 2016/0001811 | A1* | 1/2016 | Endo | B62D 5/0466 701/41 |
| 2016/0200354 | A1* | 7/2016 | Kimura | B62D 5/0472 701/42 |
| 2016/0332635 | A1* | 11/2016 | Holub | B60W 40/08 |

FOREIGN PATENT DOCUMENTS

| DE | 10 2009 028 647 A | 2/2011 |
| DE | 10 2010 033 744 A | 5/2012 |
| DE | 10 2013 209 459 A | 11/2013 |
| DE | 10 2010 019 236 B | 7/2014 |

* cited by examiner

HANDS-ON/-OFF DETECTION IN A STEER-BY-WIRE SYSTEM

CROSS REFERENCE TO RELATED APPLICATIONS

This application is a U.S. National Stage Entry of International Patent Application Serial Number PCT/EP2017/059382, filed Apr. 20, 2017, which claims priority to German Patent Application No. DE 10 2016 005 013.6, filed Apr. 26, 2016, the entire contents of both of which are incorporated herein by reference.

FIELD

The present disclosure generally relates to steering systems, including steer-by-wire steering systems for motor vehicles with electronically-controlled steering adjusters.

BACKGROUND

In steer-by-wire steering systems, the position of the steered wheels is not directly coupled to the steering wheel. There is a connection between the steering wheel and the steered wheels by means of electrical signals. Instead of the mechanical coupling, a wheel angle adjuster is used for positioning the wheels and a manual force actuator is used for simulating the restoring forces on the steering wheel.

To increase the driving safety of a motor vehicle in road traffic, modern motor vehicles comprise an increasing number of driver assistance systems that are arranged to increase active safety. Besides speed regulations and separation regulations that are partly combined therewith, lane holding systems are also known.

For said systems, steering wheel monitoring is important that determines whether there is driver activity on the steering wheel or not.

In this case, a situation in which the driver has gripped the steering wheel is referred to below as a hands-on situation, and a situation in which the driver has not gripped the steering wheel is thus referred to as no-hands driving, as a hands-off situation, which corresponds to the terms used in this technical area.

From DE 10 2009 028 647 B3, hands-on/off detection of an electrically assisted steering system is known. The detection of the driver activity on the steering wheel is carried out by means of a test signal. In this case a monitor generates a model from the test signal and the torque of the steering wheel.

DE 10 2010 019 236 B3 also discloses a method for measuring a hand touching a helicopter control. In this case, a frequency spectrum is determined from movement signals of the control, whereby it can be detected whether the driver is in contact with the control. In addition, vibrations in the surroundings of the control are detected. The frequency spectrum with the control not being touched differs from the frequency spectrum when a control is being touched. However, said methods have the disadvantage that they do not always have the desired accuracy.

Thus a need exists for a steer-by-wire steering system for motor vehicles with more accurate, sufficiently faster and always reliably working steering wheel monitoring.

DETAILED DESCRIPTION

Figure 1:
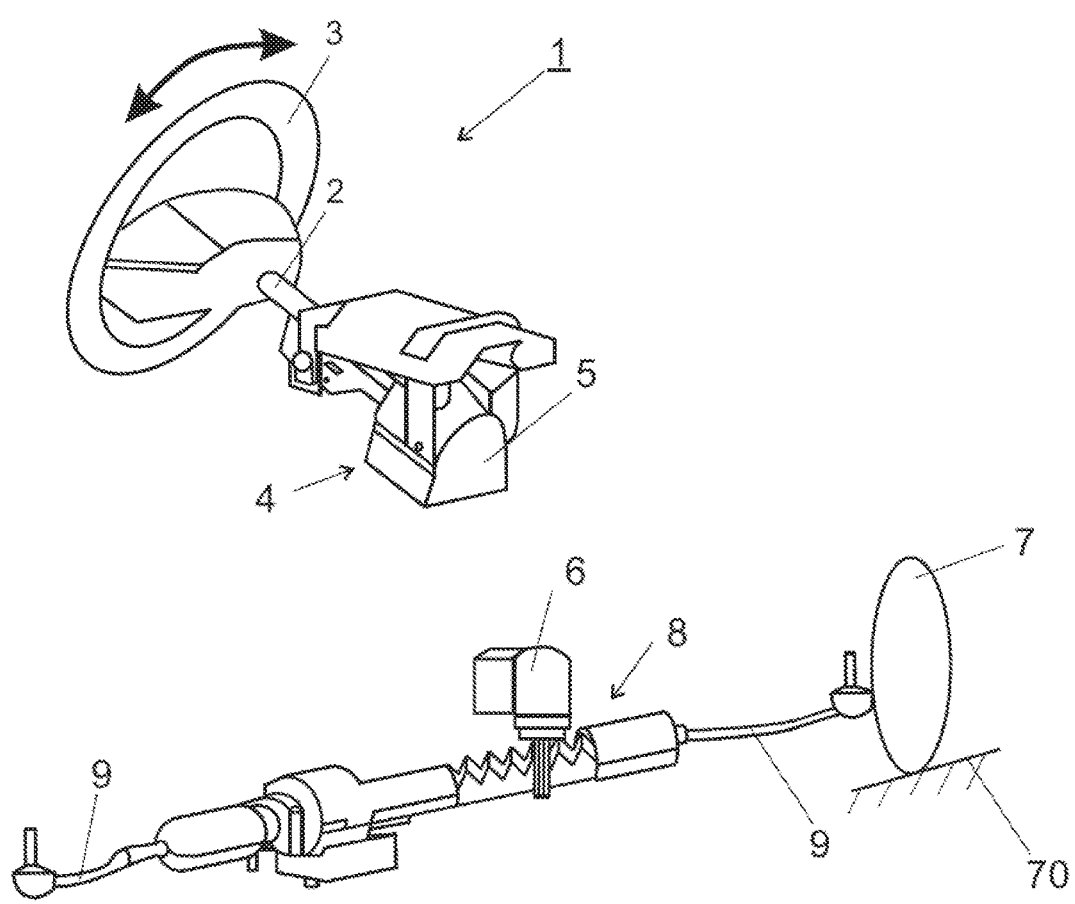
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A steer-by-wire steering system for motor vehicles may include an electronically controlled steering adjuster acting on the steered wheels depending on a driver's steering demand, a feedback actuator transmitting feedback effects from the road to a steering wheel, and a control unit that actuates the feedback actuator and the steering adjuster. The control unit comprises an estimator comprising a monitor and a model of the feedback actuator. The estimator may be arranged to estimate a driver's steering torque based on measurement values of the feedback actuator and using the model and the monitor, and to provide said driver's steering torque as a result. The control unit also comprises a filter unit that is arranged to analyze the measurement values of the feedback actuator by determining the damping of amplitudes of specified frequency ranges and to provide the result, and the control unit further comprises a decision unit that is designed to decide whether there is driver's hand contact with the steering wheel or not using the results of the filter unit and the estimator.

As a result of the contact state being checked by analysis of the frequency spectrum in addition to an estimator, the steering wheel monitoring of the steering system according to the invention operates rapidly and reliably at all times.

The filter unit preferably comprises a Goertzel algorithm for analyzing only parts of the frequency spectrum.

The monitor is preferably a Kalman filter or an "Extended Kalman Filter" for non-linear systems.

In a preferred embodiment, it is provided that the decision unit is further designed such that in the case of insufficient accuracy of the determination of the degree of damping, it can send a test signal to the feedback actuator, wherein based on the test signal and using the filter unit and the estimator, the decision unit can reliably decide whether there is driver's hand contact with the steering wheel or not. The term "sufficiently accurate" refers here to the measured frequency spectrum and whether there are enough vibrations with which any damping which is present of amplitudes in predefined frequency ranges can be determined. For example, in the course of an automatic parking process, with the motor vehicle at a standstill it is to be expected that the vibrations on the steering wheel are too small. Therefore, a test signal is necessary to ensure and reliably to decide whether the driver has his hands on the steering wheel or not.

The introduced test signal can preferably not be perceived on the steering wheel by the driver.

Furthermore, a corresponding method is provided for determining a contact state between at least one driver of a motor vehicle with a steer-by-wire steering system and a steering wheel of the steer-by-wire steering system, wherein the steer-by-wire steering system comprises a steering adjuster that is electronically controlled depending on a driver's steering demand, a feedback actuator transmitting feedback effects from the road to the control, and a control unit that actuates the feedback actuator and the steering adjuster, and the method comprises the following steps:
 a) determining a frequency spectrum of movement signals detected by sensors of the feedback actuators,
 b) analyzing the frequency spectrum with determination of the damping of amplitudes of specified frequency ranges,
 c) estimating a driver's steering torque by means of a suitable monitor of the feedback actuator, a model of the feedback actuator and the movement signals.

One step of the method d) is preferably provided that, if the analysis of the steering wheel monitoring has sufficient accuracy, comprises determination of the contact state by analysis of the estimated driver's steering torque, the steering wheel monitoring and the damping of the amplitudes of the specified frequency ranges. And furthermore, in the case of insufficient accuracy of the analysis of the steering wheel monitoring, preferably comprises the steps
 abandoning the decision as to whether there is contact,
 outputting a test signal to the feedback actuator, whereupon after producing the test signal, the method for analysis of the test signal is carried out according to the steps of the method a)-d).

The analysis of the frequency spectrum is preferably carried out in step b) by a comparison between the determined frequency spectrum and a stored reference frequency spectrum.

In a preferred embodiment, the frequency spectrum determined in step b) is filtered and the analysis of the frequency spectrum is carried out depending on the filtered frequency range of the frequency spectrum.

As already described above, the filtering is preferably carried out by a Goertzel algorithm.

Advantageously, the monitor is an "Extended Kalman Filter".

With the method it is advantageous if the model of the feedback actuator includes the inertia, damping/friction, stiffness, non-uniformity and/or dead time of the system.

In a preferred embodiment, the movement signals comprise a steering angle measured by the feedback actuator and a torque measured by the feedback actuator.

A steer-by-wire steering system 1 is shown in FIG. 1. A steering angle sensor that is not shown is attached to a steering shaft 2 and detects the driver's steering torque that is applied by rotating the steering wheel 3. Furthermore, a feedback actuator 4 that is attached to the steering shaft 2 is used to transfer the feedback effects from the road 70 to the steering wheel 3 and thus give the driver feedback about the steering behavior and the driving behavior of the vehicle. The driver's steering demand is transferred to a control unit 5 via signal lines by means of the angle of rotation of the steering shaft 2 that is measured by the steering angle sensor. The control unit 5 actuates an electrical steering adjuster 6 that controls the position of the steered wheels 7 depending on the signal of the steering angle sensor and other input variables, such as for example the speed of the vehicle, the yaw rate and similar. The steering adjuster 6 acts indirectly on the steered wheels 7 via a steering transmission 8 and track rods 9 and other components.

Figure 2:
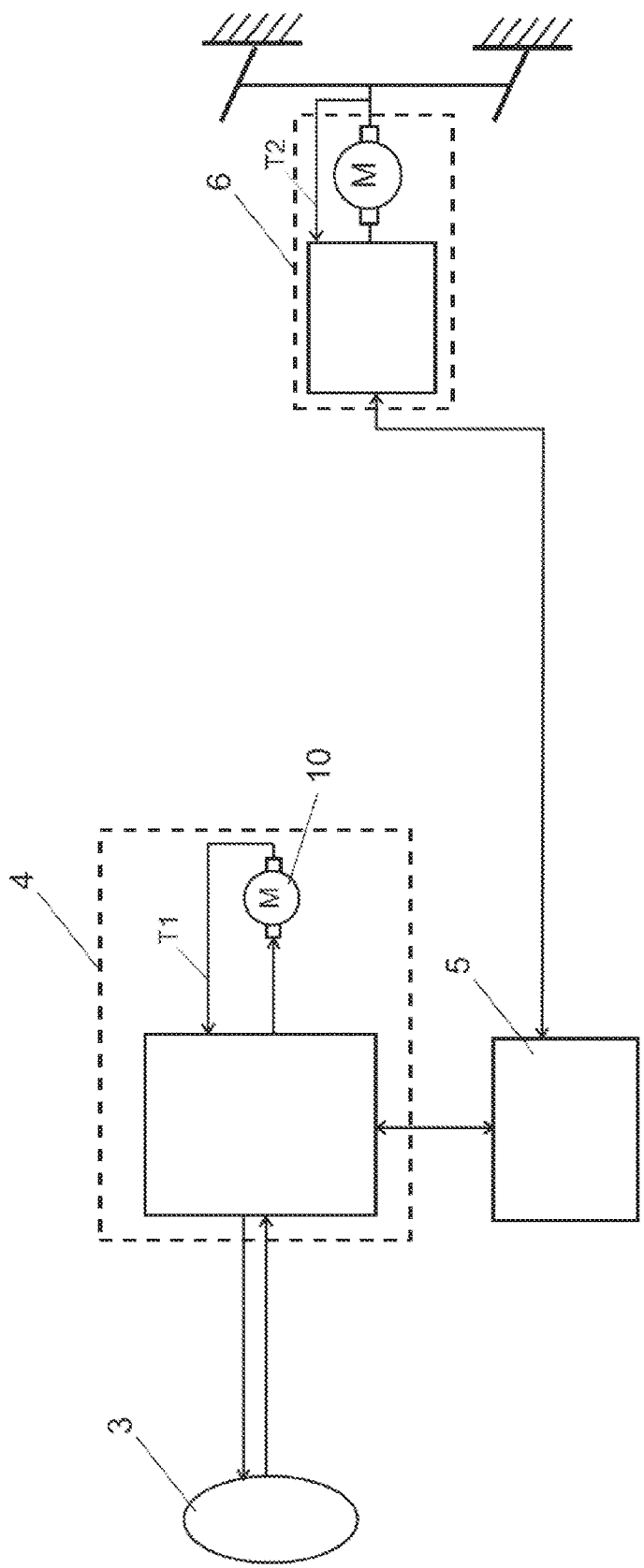
FIG. 2 is a block diagram of a controller of an example steer-by-wire steering system.
Figure 3:
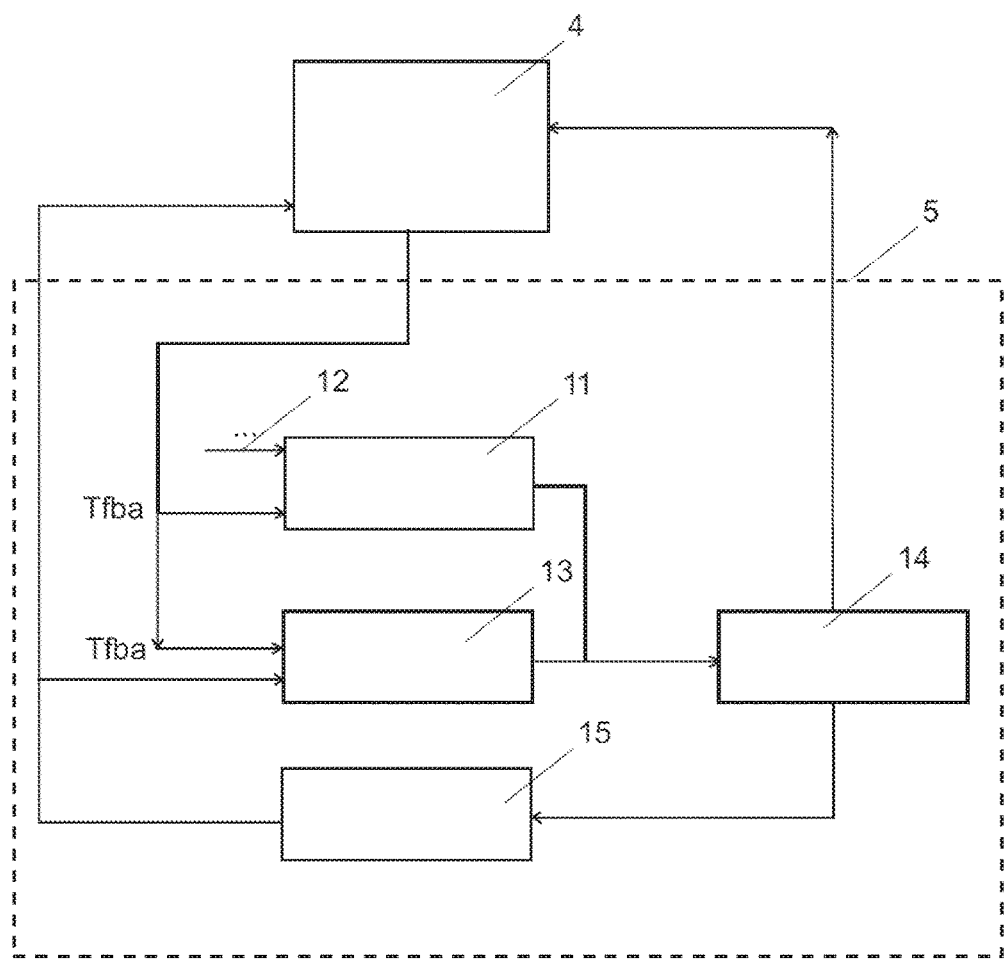
FIG. 3 is a block diagram with an example control unit and an example feedback actuator.

FIG. 2 shows the relationship between the feedback actuator 4, the control unit 5 and the steering adjuster 6. The feedback actuator 4 comprises the angle of rotation-sensor, a torque sensor and a motor 10. The feedback actuator 4 communicates with the control unit 5, which comprises an estimator 11. As shown in FIG. 3, the estimator 11 receives signals from the feedback actuator 4 representing a steering angle and a torque applied to the feedback actuator 4.

The steering angle from the feedback actuator 4 measured by means of the steering angle sensor and the torque measured by means of the torque sensor are thus the input variables for the estimator 11.

The estimator estimates from said measurement values a steering torque of the driver or a driver's steering torque; the torque that the driver applies to the steering wheel. For this the estimator uses a model 12 of the feedback actuator 5 and a Kalman filter as the monitor.

As the input for the state model 12 of the feedback actuator 4, inter alia the following physical properties are taken into account: the inertia, damping/friction, stiffness, non-uniformity and dead time of the system.

The concept of a Kalman filter concerns a method for estimating the temporal development of linear systems, by means of which noise can be removed from a measurement signal. The filter requires a model of the system to be estimated for this.

Non-linear relationships are preferably taken into account, so that the estimator is based on an extended Kalman filter and a non-linear model of the feedback actuator.

In addition to the estimated driver's steering torque, the damping of amplitudes of predefined frequency ranges is determined by means of a filter 13 from the steering angle and torque measured by the feedback actuator.

If the driver is grasping the steering wheel 3, then vibrations are partly absorbed because of the new overall mechanical system and the changed damping properties. The frequency spectra of the steering wheel when not being held differ characteristically from those of the steering wheel that is being held. The difference between the hands-on and the hands-off states can thus be seen in the frequency spectrum of the measured sensor signals of the feedback actuator 4.

In this case, it is advantageous if only certain frequency ranges are used. Thus it is known for example that characteristic vibrations can be detected in higher frequency ranges, which are made up of vibrations from the surroundings of the steering wheel. If the steering wheel is now grasped, then said frequency ranges change accordingly, which can then be detected.

A Goertzel algorithm preferably only analyzes certain frequency ranges, using which steering wheel monitoring is carried out.

There are thus two almost mutually independently conducted estimations that are combined with each other in a final analysis step of a decision unit 14 to reliably determine whether hand contact or a driver's steering torque is applied to the steering wheel or not.

If the vibrations occurring in the driving mode are not sufficient for the determination of the damping of the amplitudes in the predefined frequency ranges, a test signal 15 of a defined intensity and amplitude is introduced into the feedback actuator 4 by means of the feedback motor 10 and a symmetrical oscillation is produced at the steering wheel 3. Thereupon, using the estimated driver's steering torque and by means of frequency analysis of the Goertzel filter, the effect on the feedback actuator 4 of touching the steering wheel 3 is detected and hence the current operating state (hands-on/off) is determined.

If the vehicle is cornering and a hands-off situation at the steering wheel 3 is determined, it can be necessary to move the steering wheel 3 back to the neutral position in order to enable straight-ahead travel. When restoring the steering wheel 3 to the neutral position, the steering feel on the steering wheel 3 is adjusted. "Adjusted" means that smooth resetting is enabled by means of a higher adjustable friction or damping depending on the speed of the vehicle and the steering angle rate and the steering direction, and the driver is thus provided with a highly natural steering feel in the event of a new hands-on situation.

What is claimed is:

1. A steer-by-wire steering system for a motor vehicle, the steer-by-wire steering system comprising:
   a steering adjuster that acts on steered wheels of the motor vehicle and is electronically controlled based on a driver's steering demands;
   a feedback actuator that transmits feedback effects of a road to a control; and
   a control unit that actuates the feedback actuator and the steering adjuster, the control unit comprising
      an estimator that has a monitor and a model of the feedback actuator, wherein the estimator estimates a driver's steering torque based on measurement values of the feedback actuator and the model and the monitor and provides the driver's steering torque as a result,
      a filter unit that analyzes the measurement values of the feedback actuator by determining damping of amplitudes of predetermined frequency ranges and that provides a result, and
      a decision unit that decides whether a driver's hand is in contact with a steering wheel based on the results of the filter unit and the estimator.

2. The steer-by-wire steering system of claim 1 wherein the filter unit comprises a Goertzel algorithm.

3. The steer-by-wire steering system of claim 1 wherein the monitor is an extended Kalman filter.

4. The steer-by-wire steering system of claim 1 wherein depending on an accuracy of the determination of the damping in the filter unit, the decision unit is configured to send a test signal to the feedback actuator, wherein via the test signal, the filter unit, and the estimator the decision unit determines whether the driver's hand is in contact with the steering wheel.

5. A method for determining a contact state between a driver of a motor vehicle with a steer-by-wire steering system and a steering wheel of the steer-by-wire steering system, wherein the steer-by-wire steering system comprises a steering adjuster that is electronically controlled based on a driver's steering demands, a feedback actuator that transmits feedback effects of a road to the steering wheel, and a control unit that actuates the feedback actuator and the steering adjuster, the method comprising:
   determining a frequency spectrum of movement signals detected by sensors of the feedback actuator;
   analyzing the frequency spectrum by determining damping of amplitudes of predetermined frequency ranges; and
   estimating a driver's steering torque with a monitor of the feedback actuator, a model of the feedback actuator, and the movement signals.

6. The method of claim 5 wherein if the analysis of the frequency spectrum exceeds a predetermined level of accuracy, the method comprises determining the contact state by analyzing estimated driver's steering torque, the frequency spectrum, and the damping of amplitudes of the predetermined frequency ranges.

7. The method of claim 6 wherein if the analysis of the frequency spectrum fails to exceed the predetermined level of accuracy, the method comprises outputting a test signal to the feedback actuator prior to performing the steps of determining the frequency spectrum, analyzing the frequency spectrum, estimating the driver's steering torque, and determining the contact state.

8. The method of claim 5 wherein analyzing the frequency spectrum comprises comparing the determined frequency spectrum with a stored reference frequency spectrum.

9. The method of claim 5 comprising filtering the determined frequency spectrum, wherein analyzing the frequency spectrum is performed depending on a filtered frequency range of the frequency spectrum.

10. The method of claim 9 wherein the filtering utilizes a Goertzel algorithm.

11. The method of claim 5 wherein the monitor is an extended Kalman filter.

12. The method of claim 5 wherein the model of the feedback actuator contains at least one of inertia, damping/friction, stiffness, non-uniformity, or dead time of the steer-by-wire steering system.

13. The method of claim 5 wherein the movement signals comprise an angle of rotation of a steering shaft that is measured by the feedback actuator and a torque that is measured by the feedback actuator.

* * * * *